June 21, 1960   H. L. MOSLEY   2,941,622
LUBRICATING ACCESSORY
Filed Jan. 16, 1958
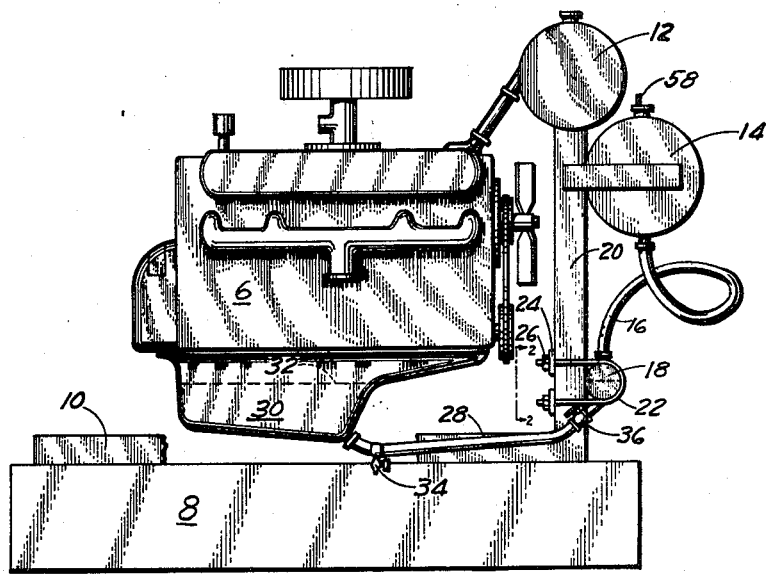
FIG - 1
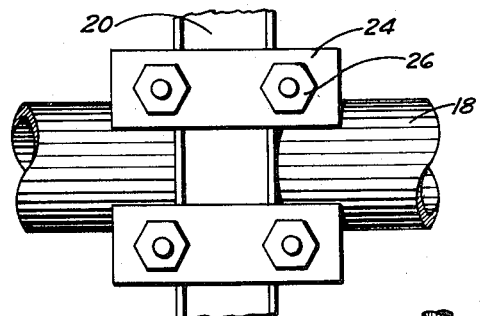
FIG - 2
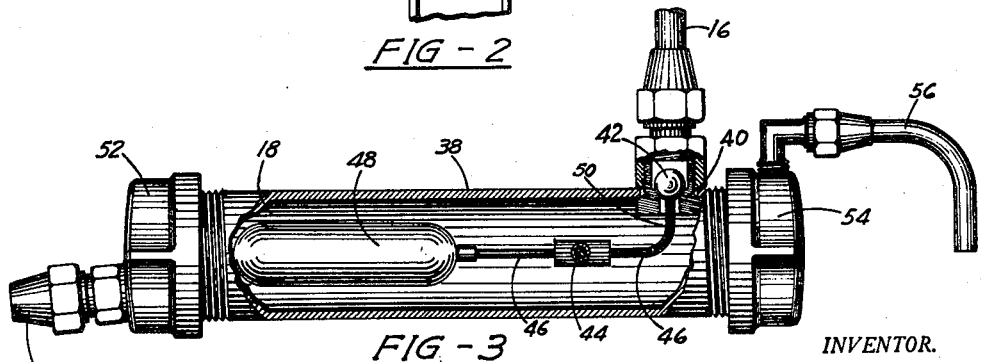
FIG - 3
INVENTOR.
Howard L. Mosley
BY
Atty.

United States Patent Office 2,941,622
Patented June 21, 1960

2,941,622
LUBRICATING ACCESSORY

Howard L. Mosley, Rte. 1, Lockney, Tex.

Filed Jan. 16, 1958, Ser. No. 709,330

1 Claim. (Cl. 184—103)

This invention pertains to lubricating accessories and more particularly to a system for maintaining a constant oil level in internal combustion engines.

In agriculture and otherwise, there are a great number of internal combustion engines used as stationary power plants developing 5 to 20 horse power. Many of these internal combustion engines are operated for 24 hours a day and with only occasional, unskilled and unreliable supervision. One of the problems in this type operation is maintaining the oil at a desirable level.

An object of this invention is to provide a device for maintaining the oil level in an internal combustion engine at the desired level.

Another object is to achieve this with a device that is simple, sturdy and reliable, yet cheap and easy to manufacture.

The specific nature of the invention as well as other objects, uses and advantages thereof will clearly appear from the following description and from the accompanying drawing, in which:

Fig. 1 is an elevational view of the general arrangement of the device in accordance with this invention and in connection with an internal combustion engine.

Fig. 2 is a enlarged elevational view particularly showing the manner in which the float chamber is adjustably attached to the frame.

Fig. 3 is an axial sectional view of the float chamber.

One embodiment of this invention, as seen in the accompanying drawings, is designed to be attached to the frame of stationary engine 6 used for irrigation purposes. These engines have frame 10 associated with them which supports the engine generally over a spill-way 8. This frame 10 also supports a water tank 12. The frame 10 also supports oil reservoir 14, which is attached to the frame in any convenient manner.

Conduit 16 connects the bottom of the reservoir to the top of float chamber 18. The float chamber is mounted on the frame vertically adjustable thereto. As seen in the accompanying drawing, this is accomplished by attaching it to one of the vertical supports 20 of the water tank. U-bolts 22 extend around the float chamber and are threaded on either end. Straps 24 extend on the other side of the frame from one threaded end of one rod to another. As may be seen, by loosening nuts 26, the float chamber as a whole may be raised or lowered vertically. From the bottom of the float chamber there is second flexible conduit 28 which leads to a point on oil pan 30 which is below the desired oil level 32.

The connection to the oil pan will ordinarily be through the regular threaded connection wherein the oil drain plug is inserted. In this way, the device can be attached to an engine without the necessity of cutting an additional hole in the oil pan. As the float is connected to the normal drain plug, it is necessary to provide a spigot 34 so the oil may be drained from the pan when desired. It is necessary to have a valve 36 in the second conduit to prevent the oil from flowing from the reservoir out the spigot while draining oil from the oil pan.

The float chamber comprises a cylindrical body 38 conveniently made from a section of ordinary pipe threaded at both ends with a valve seat 40 inserted at the top at one end. The conduit 16 attaches to this valve seat and in this respect the valve seat may be considered the last link in the conduit. Ball valve 42 normally rests on the valve seat thereby shutting off the flow of oil. A horizontal shaft 44 extends between the walls of the cylinder. Pivoted to this shaft is arm 46. On one side of the shaft the arm has a float 48. On the other end of the shaft there is an upstanding leg or valve actuator 50. The cylinder is closed on either end by standard pipe caps 52, 54. The second conduit 28 is attached to the lower half of cap 52 while an overflow pipe 56 is attached to the upper portion of cap 54.

If the oil in this system is at the desired oil level 32, or above, the float will cause the arm to pivot in a clockwise direction about shaft 44. Therefore, the valve actuator will not touch the ball valve. However, should the oil get below the desired level, the weight of the float will cause the arm to rotate in a counter-clockwise direction, thereby the valve actuator will push the ball valve 42 upward permitting oil to flow by gravity through conduit 16 into the float chamber from whence it flows out through the second conduit into the oil pan itself.

If for any reason, the ball valves get stuck in an open position, the excess of oil will not flow into the oil pan because it will flow out overflow pipe 56. The overflow pipe also provides an air inlet into the float chamber so that the chamber will not get an air lock. If the chamber were not maintained at atmospheric pressure, this would give a false indication of the level between the oil pan and the chamber. The second conduit 28, from the float chamber to the oil pan, is below the desired oil level at all points so there will not be an air lock in it. If there were an air lock in the conduit, there would be a false indication between the level as indicated by the float chamber and actually existing in the oil pan. Also the cap of the reservoir has a vent 58 to the atmosphere.

The float chamber is adjustable in height for several reasons. The oil level existing in the pan while the engine is running will be different from the level when the engine is stopped. The reason for this is that when the engine is running, a certain amount of oil is being circulated through the engine and a certain amount is in a spray in the pan. Therefore, if the float were set to maintain the oil at a full level when the engine was running, when the engine was stopped there would be an excess of oil in the pan. For this reason, it is necessary to set the float somewhat lower. The exact position of the float would depend upon the type engine, the speed of the engine, the time of the year, the type of service and the personal preferences of the operator.

Thus it may be seen that I have invented a simple system to maintain the oil in an internal combustion engine at the desired level even though it is irregularly checked by unskilled mechanics. With a reservoir large enough to hold a week's supply of oil, it is only necessary to drain the oil from the pan once a week, refill the reservoir, and dismiss the oil problem in that engine for another week.

It will be apparent that the embodiment shown is only exemplary and that various modifications can be made in construction, materials, and arrangement within the scope of the invention as defined in the appended claims.

As seen in the drawing, all the fittings are either standard copper tubing or standard pipe fittings. Thus the device is well adapted to be fabricated on a small scale with equipment and material found in extremely small shops.

I claim as my invention:

On an internal combustion engine having an oil pan and a frame with a vertical member, a device for maintaining a constant oil level in the oil pan, comprising: an oil reservoir supported by the vertical member on the frame, a float chamber, U-bolts extending around the float chamber and having straps behind the vertical member thus adjustably attaching the float chamber to the vertical member, a conduit connecting the bottom of said reservoir into the top of said float chamber, an overflow pipe connected to the top of the float chamber for preventing an undesirable high level of oil therein and assuring the chamber is maintained at atmospheric pressure, a float in the chamber, an arm attached at one end to the float and the other end being bent vertically upward, said arm being pivoted to the chamber between the point of attachment to the float and the upper bend, a valve seat at the point of connection of the conduit from the reservoir to the chamber at the chamber, a ball valve resting on said valve seat, said upward bent portion of said arm positioned immediately below the ball valve, so that if the float moves downward the vertical portion of said arm will move upward thus moving the valve from its seat, said oil pan having a drain plug opening at the lowest point thereof, a flexible conduit from the float chamber to said drain plug opening in said oil pan, a spigot at the lowest point of the flexible conduit leading from the chamber to the pan, and a valve in said flexible conduit from said oil pan to chamber adjacent said chamber, so that the oil may be drained from the pan through said spigot without draining the oil from the said reservoir.

References Cited in the file of this patent

UNITED STATES PATENTS

| | | |
|---|---|---|
| 1,155,168 | Andrew et al. | Sept. 28, 1915 |
| 1,171,223 | Martini | Feb. 8, 1916 |
| 1,230,658 | Brace | June 19, 1917 |
| 1,330,236 | Burton | Feb. 10, 1920 |
| 1,623,374 | Anderson | Apr. 5, 1927 |

FOREIGN PATENTS

| | | |
|---|---|---|
| 464,121 | France | Jan. 6, 1914 |